Nov. 19, 1957  K. STECHER  2,813,278
HAND TOOL
Filed July 25, 1956
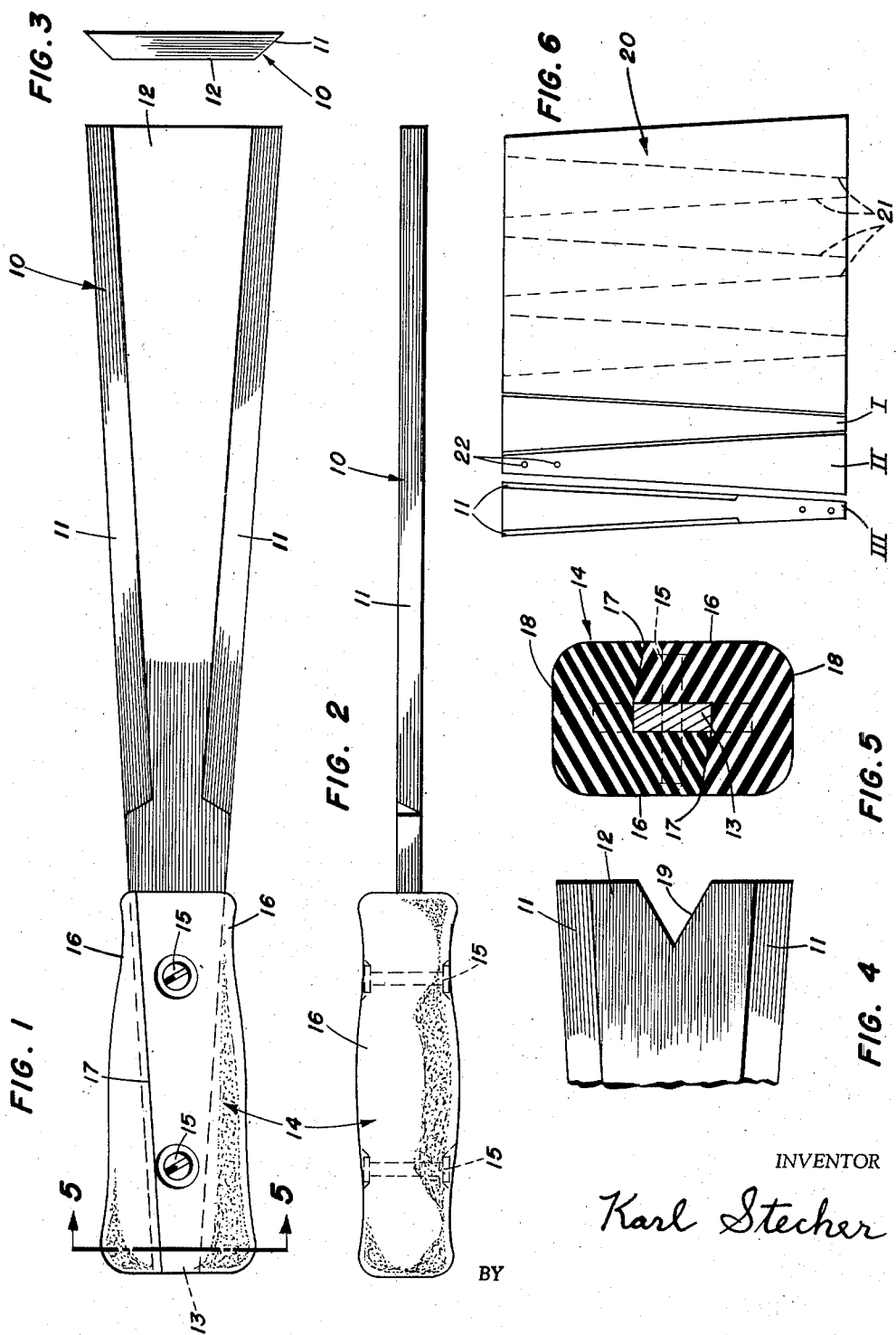

United States Patent Office 2,813,278
Patented Nov. 19, 1957

2,813,278
HAND TOOL
Karl Stecher, Chevy Chase, Md.
Application July 25, 1956, Serial No. 599,987
5 Claims. (Cl. 7—14.1)

This invention relates to hand tools and more particularly to multiple purpose implements for performing cutting, pounding and/or prying operations.

Heretofore hand tools in the nature of sickles and knives have been employed wherein a relatively light cutting blade is secured to a heavy handle for manual use in cutting long grass, shrubs, hacking limbs and otherwise clearing land. Such devices frequently comprise thin metallic blades of curved shape which during manufacture must be carefully formed, ground and heat treated and must be specially formed to connect with a handle. Obviously, a tool so made is not sufficiently rugged for use as a cutting implement to sharpen tent stakes, for example, and then, with a flip of the wrist as a pounding implement to drive such stakes into the ground or remove stakes so driven and is not adapted for prying or levering action.

It is accordingly an object of the present invention to provide a hand implement having compound use as a cutting device, a pounding device, or a prying device and which is simple in construction, cheap and easy to manufacture and rugged in design.

A further object of this invention is to provide such an implement with the proper distribution of weight and balance so that maximum benefit will be obtained during a cutting or pounding blow.

Another object of the present invention is to provide a simply secured and comfortable handle for such an implement.

Another object of the present invention is to provide a tool design which is adapted to easy manufacture without requiring complicated machine tools or metal forming or shaping machines.

Other objects and many of the attendant advantages will be readily appreciated as the invention becomes better understood by reference to the following detailed description when considered in conjunction with the accompanying drawings wherein:

Fig. 1 is a face view of an implement illustrating one embodiment of the invention;

Fig. 2 is a side elevational view of the embodiment of Fig. 1;

Fig. 3 is an end view of the embodiment of Figs. 1 and 2;

Fig. 4 shows a slight modification in construction which particularly adapts the device for prying or lifting use;

Fig. 5 is an enlarged cross-sectional view taken along a line substantially corresponding to line 5—5 of Fig. 1; and Fig. 6 is a greatly reduced plan view of a sheet of base material showing various stages in the manufacture of the device of the invention.

In the embodiment illustrated there is shown an elongated blade member 10 of tapered outline the sides of which are ground to provide cutting edges 11. This embodiment has a generally wide right-hand end as shown in Fig. 1 to increase the weight and amount of material concentrated there and is greatly reduced in width at the left-hand end 13 to receive a hand accommodating handle 14, held in place by screws 15.

In the embodiment illustrated the handle is shown formed of two complementary, closely interfitting parts 16, identical in configuration and shape which surround the small end 13 of the implement and are held in place by screws 15. It will be apparent that a handle formed as illustrated not only is comfortable and conforms to the contours of the closed human hand but also, since the two parts are identical in shape, they require only one mold, with a consequent saving of tooling costs. It will be obvious that the handle may be formed of either soft or hard material such as plastic, hard rubber, or soft rubber which latter would absorb shock and vibrations in use.

Another feature of the handle construction is the shaping of each handle half so that the line of separation 17 appears at the sides and not at the top and bottom surfaces 18 of the member as shown in Fig. 5. By this arrangement the surface 18, which is narrower and more strongly crowded into the palm, is left smooth and free of any line or groove which might render that portion of the handle uncomfortable to the user.

In the modification shown in Fig. 4 the wide end 12 of the implement is provided with a notch 19 of suitable size to engage small sticks or stakes such as tent stakes to aid in extracting the latter from the ground since the tool of the instant invention has obvious utility as a camping implement by which such stakes may readily be driven into the ground or removed.

The construction just described is readily adapted to mass production with a minimum amount of metal working equipment and is purposely made of the shape and design illustrated so as to facilitate such manufacturing technique. As shown in Fig. 6 a sheet of material 20, which is preferably of rhomboidal shape may be cut along the indicated dotted lines 21 by any suitable straight line metal shear to provide at stage (I) a blank of the desired overall shape in which holes 22 may be punched or drilled at stage (II) and the edges of which may be ground at 11 in stage (III) to provide the completed implement. If desired, heat treating may be accomplished during the above-described stages and the tool blade of the invention is advantageously shaped for that purpose thus avoiding the difficulties formerly encountered in hardening thin bladed brittle implements. To the implement at stage (III) is then affixed the handle which is shaped as illustrated to closely engage the small end of the blade and is secured in place by rivets or screws 15.

It will be obvious that the manufacture of the construction illustrated requires only a simple straight line cutting shear, a hole punch or drill for perforating the blade and a grinder for shaping the cutting edges. There are no complicated contours to be shaped, no protruding parts to provide a holding and handling problem during the grinding step and no elaborate fastening means required to secure the handle in place.

In the use of this implement the heavy mass concentrated at the far end of the tool aids movement of the blade through its working arc and gives balance and poise to the cutting stroke. It also provides a sufficient weight for pounding or striking blows by the flat of the blade, which would not otherwise be feasible in a cutting tool of this description. Furthermore by providing cutting edges on both sides of the blade, both at the same angle, it is entirely feasible to cut on the return as well as the forward stroke without loss of balance and hence the maximum effectiveness can be obtained.

In the present approach to the problem of a combination tool it will be noted that contrary to conventional practice the blade is not formed to meet the needs of the handle or of the handle attaching fixture. Instead the blade is production designed to permit economical and simple manufacturing operations without scrap or waste material or expensive machinery and machining operations. Thereafter a blade so made is fitted with a specially designed handle that utilizes the afore-mentioned blade design in its securing attachment thereto.

The tool which I have invented is very easily and safely used, since its balance is such that little effort is required to manipulate it, while its overall weight is adequate to permit effective pounding and chopping operations.

When the parts of this tool are all correctly and scientifically made as to size, shape, weight, balance, and proportion with relation to each other, and then correctly assembled, they all contribute toward the production of a unique result, which is a tool possessing features not found in any other tool heretofore known.

It will be obvious to those experienced in the art that certain variations are permissible without departing from the basic principles of the invention. A tool of the multiple usefulness of this one will justify manufacture by more expensive means than those herein set forth. For example, the blade member may be made from a forging instead of being cut from a flat plate. Different styles of handles may be used. The handle shown is made from contoured halves possessing certain desirable qualities. The handle may be made with a socket for the insertion of the blade, or it may be made detachable. The essential feature is that the handle and the blade be so made that the proper balance is achieved for efficient use.

While Fig. 1 and Fig. 3 show a cutting edge produced by grinding on only one of the lateral sides of the blade, it will be obvious that the cutting edge may be formed by grinding on either or both of the opposing sides of the blade without departing from the basic principles of the invention, the purpose in either method being the production of an efficient cutting edge.

While Fig. 6 shows a method of producing the blades for this tool from flat plate material, such blades may be produced from forgings or in some other manner without departing from the basic principles of the invention, the purpose of Fig. 6 being to show an economical method of manufacture under present conditions.

From the foregoing description it will be apparent to those skilled in the art that various modifications thereof may be made without departing from the spirit and scope of this invention and it is desired, therefore, that the same be limited only by the scope of the prior art and the appended claims.

Having thus described the invention, what is claimed and desired to be secured by Letters Patent is:

1. A compound tool for sharpening, driving and removing camp stakes or the like from the ground comprising, a trapezoidally contoured first member formed from a flat plate, said first member having opposite non-parallel edges sharpened along a substantial portion thereof, the wider end of said trapezoid forming a concentration of mass to augment inertial forces when the implement is employed in a cutting or driving operation with an angular motion and the opposite narrower end of said first member being formed to cooperate with a handle like second member, said second member comprising a pair of oppositely disposed trapezoidal member encircling portions having interfitting edges to closely grasp the sides and edges of the reduced trapezoidal portion, each portion of said second member being identical in shape and of substantial L-shape in cross section.

2. A multipurpose hand implement for use in cutting, pounding, or prying operations comprising an equilateral trapezoidally shaped planar first member having a heavy end and a light end, said first member having opposite non-parallel edges sharpened along a substantial portion thereof, the light end being apertured to receive handle attaching means therethrough, a handle snugly encircling the apertured portion of said light end, said handle being formed of a soft relatively resilient material and having a pair of identical but oppositely arranged halves, each half being L-shaped in cross-section and closely contacting a side and an edge of the light end so that the line of separation of the halves is on a side of a handle normal to the plane of the material in the blade, the interfitting edges of said handle halves being sloped so that handle grasping pressure serves to urge the contacting edges of the halves toward each other.

3. A compound tool for sharpening, driving and removing camp stakes or the like from the ground comprising a trapezoidally contoured first member formed from a flat plate, said first member having opposite non-parallel edges at least one of which is sharpened along a substantial portion thereof, the wider end of said trapezoid forming a concentration of mass to augment inertial forces when the implement is employed in a cutting or driving operation with an angular motion and the opposite narrower end of said first member being formed to cooperate with a handle like second member encompassing and securing said first member, said tool being balanced about its longitudinal axis, the half length comprising the wider end of the first member being substantially heavier than the opposite half length comprising the handle portion, whereby to obtain efficient cutting, chopping and pounding operations.

4. A compound tool for sharpening, driving and removing camp stakes or the like from the ground comprising a substantially trapezoidally contoured relatively flat first member, said first member having opposite non-parallel edges at least one of which is sharpened along a substantial portion thereof, the wider end of said trapezoid forming a concentration of mass to augment inertial forces when the implement is employed in a cutting or driving operation with an angular motion and the opposite narrower end of said first member being formed to cooperate with a handle like second member encompassing and securing said first member, said tool being balanced about its longitudinal axis, the half length comprising the wider end of the first member being substantially heavier than the opposite half length comprising the handle portion, whereby to obtain efficient cutting, chopping and pounding operations.

5. A hand implement for use in cutting, chopping and pounding operations comprising a relatively flat elongated blade member of substantial thickness tapered from a substantially wide pounding portion to a relatively narrow handle engaging portion symmetrically about a longitudinal axis, said blade member having lateral non-parallel edges at least one of which is sharpened to provide a cutting and chopping portion along a substantial part of the exposed length thereof, a handle encompassing and securing the narrow handle engaging portion of the blade member, the weight of said blade member and handle being substantially equally distributed on the opposing sides of the said longitudinal axis of said blade member so that said implement will be balanced for cutting and chopping about said longitudinal axis, the half length of said implement comprising the pounding portion being substantially heavier than the opposite half length comprising the handle portion, whereby to obtain efficient cutting, chopping and pounding operations.

References Cited in the file of this patent

UNITED STATES PATENTS

| | | |
|---|---|---|
| 416,594 | Goddard | Dec. 3, 1889 |
| 960,624 | Compton | June 7, 1910 |
| 2,498,107 | Ferguson | Feb. 21, 1950 |
| 2,676,406 | Hoke | Apr. 27, 1954 |
| 2,718,700 | Stecher | Sept. 27, 1955 |

FOREIGN PATENTS

| | | |
|---|---|---|
| 392,172 | France | Sept. 17, 1908 |